(12) United States Patent
Chamberlain

(10) Patent No.: US 8,006,993 B1
(45) Date of Patent: Aug. 30, 2011

(54) BICYCLE FRAME

(75) Inventor: Jason L. Chamberlain, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 4 days.

(21) Appl. No.: 12/780,710

(22) Filed: May 14, 2010

(51) Int. Cl.
*B62K 25/20* (2006.01)
(52) U.S. Cl. ..................................... 280/284; 280/281.1
(58) Field of Classification Search .................. 280/284, 280/281.1, 283, 288, 274, 275; 267/195; D12/111
See application file for complete search history.

(56) References Cited

U.S. PATENT DOCUMENTS

| | | | | |
|---|---|---|---|---|
| D34,257 S | * | 3/1901 | Sangster | |
| D43,083 S | * | 10/1912 | Lonn | |
| D44,950 S | * | 10/1913 | Lonn | |
| 1,340,508 A | * | 5/1920 | Walker | |
| 1,413,352 A | * | 4/1922 | Peters | |
| 2,238,411 A | * | 4/1941 | Conklin | |
| 3,679,029 A | * | 7/1972 | Thomas | |
| 3,982,770 A | | 9/1976 | Satoh et al. | |
| 4,013,149 A | * | 3/1977 | Fabre et al. | |
| 4,046,396 A | | 9/1977 | Taylor et al. | |
| 4,378,857 A | | 4/1983 | Andersson | |
| 4,697,659 A | * | 10/1987 | Zimmerman | |
| 4,789,174 A | * | 12/1988 | Lawwill | |
| 5,244,224 A | * | 9/1993 | Busby | |
| 5,592,999 A | * | 1/1997 | Matsuura et al. | |
| 5,671,936 A | * | 9/1997 | Turner | |
| 5,725,227 A | * | 3/1998 | Mayer | |
| 5,791,674 A | * | 8/1998 | D'Aluisio et al. | |
| D398,267 S | * | 9/1998 | Yu et al. | |
| D401,187 S | * | 11/1998 | Ninic et al. | |
| D402,926 S | * | 12/1998 | Kciuk | |
| 5,899,480 A | * | 5/1999 | Leitner | |
| 6,039,137 A | | 3/2000 | Schless | |
| D430,070 S | * | 8/2000 | Kciuk | |
| 6,109,636 A | * | 8/2000 | Klein et al. | |
| 6,224,080 B1 | * | 5/2001 | Ross | |
| 6,273,407 B1 | * | 8/2001 | Germano | |
| 6,279,703 B1 | | 8/2001 | Mete | |
| 6,318,521 B1 | * | 11/2001 | Niaura et al. | |
| D491,111 S | * | 6/2004 | Mizuta et al. | |
| 6,837,506 B2 | * | 1/2005 | Amos | |

(Continued)

FOREIGN PATENT DOCUMENTS

EP 1 352 823 10/2003

(Continued)

OTHER PUBLICATIONS

Diamondback DBR-X2 1999.

(Continued)

*Primary Examiner* — Anne Marie Boehler
*Assistant Examiner* — Tashiana Adams
(74) *Attorney, Agent, or Firm* — Knobbe, Martens, Olson & Bear, LLP

(57) ABSTRACT

A bicycle assembly can include a bicycle frame that can have a main frame, a sub-frame and a shock absorber. The sub-frame can move in relation to the main frame and the shock can be used to regulate that relationship. A extension body can be used to establish a rear pivot point of the shock absorber. In some embodiments, the extension body can also be used to adjust the length of the combined shock absorber and extension body.

22 Claims, 5 Drawing Sheets

U.S. PATENT DOCUMENTS

| | | | |
|---|---|---|---|
| 6,877,591 B1 * | 4/2005 | Hso | 188/321.11 |
| 6,880,846 B2 * | 4/2005 | Schonfeld | |
| 6,969,081 B2 | 11/2005 | Whyte | |
| 6,978,985 B2 * | 12/2005 | Lung et al. | |
| D523,380 S * | 6/2006 | Auger et al. | |
| 7,140,628 B2 | 11/2006 | Parkin | |
| 7,261,194 B2 | 8/2007 | Fox | |
| 7,318,505 B2 | 1/2008 | Müller et al. | |
| 7,374,191 B1 | 5/2008 | Tseng | |
| 7,392,999 B2 | 7/2008 | O'Connor | |
| 7,506,884 B2 | 3/2009 | Fox | |
| 7,703,788 B2 | 4/2010 | Tanouye et al. | |
| 7,954,837 B2 * | 6/2011 | Talavasek | 280/284 |
| 2003/0038450 A1 | 2/2003 | Lam | |
| 2003/0160372 A1 * | 8/2003 | Klitsch et al. | 267/195 |
| 2004/0061305 A1 | 4/2004 | Christini | |
| 2005/0184483 A1 * | 8/2005 | Buckley | 280/284 |
| 2006/0181053 A1 | 8/2006 | Huang et al. | |
| 2006/0273542 A1 * | 12/2006 | Chamberlain | 280/274 |
| 2008/0067772 A1 * | 3/2008 | Weagle | 280/124.134 |
| 2008/0258427 A1 * | 10/2008 | Buckley | 280/284 |
| 2008/0303242 A1 * | 12/2008 | O'Connor | 280/284 |
| 2009/0026728 A1 * | 1/2009 | Domahidy | 280/284 |
| 2009/0072512 A1 * | 3/2009 | Earle | 280/283 |
| 2010/0109282 A1 | 5/2010 | Weagle | |
| 2010/0327554 A1 * | 12/2010 | Talavasek | 280/284 |
| 2010/0327556 A1 * | 12/2010 | Chamberlain | 280/284 |
| 2011/0018228 A1 * | 1/2011 | Beale et al. | 280/284 |

FOREIGN PATENT DOCUMENTS

| | | |
|---|---|---|
| EP | 1 669 282 | 6/2006 |
| WO | WO 2007/036225 | 4/2007 |

OTHER PUBLICATIONS

Giant Pistol 2007.
Manitou FS 1996.
Ibis Mojo Carbon Setup Guide 2007.
Davis, Previewed: GT Fury Downhill Race Bike, www.bikemag.com, Jun. 24, 2008.
Methven, "Scott Ransom SL", Dirt Rag, Apr. 1, 2007, pp. 52-53.
"Titus Does it Our Way", Mountain Bike Action, Jul. 2005, pp. 50-52.

* cited by examiner

BICYCLE FRAME

BACKGROUND OF THE INVENTION

1. Field of the Invention

The present invention relates generally to bicycle suspension systems and frame assemblies. In particular, the present invention relates to configurations for rear suspension assemblies and mounting arrangements for rear suspension assemblies suitable for use in connection with off-road bicycles.

2. Description of the Related Art

Off-road bicycles, or mountain bikes, may be equipped with front and rear suspension assemblies operably positioned between the frame of the bicycle and the front and rear wheels, respectively. Providing front and rear suspension on a mountain bike potentially improves handling and performance by absorbing bumps, and other rough trail conditions, which may be encountered while riding off-road. However, because mountain bikes are typically pedal-driven, i.e., use the rider's power output to propel the bicycle, the provision of rear suspension, especially, may undesirably absorb a rider's power output, resulting in wasted effort.

Accordingly, rear suspension systems commonly incorporated on engine-driven vehicles, such as motorcycles, have proven undesirable for use with pedal-driven vehicles, such as mountain bikes. In addition, because a mountain bike is propelled solely by power output from the rider, it is desirable that the rear suspension assembly be lightweight. Rear suspension systems of engine-driven vehicles commonly emphasize strength over weight and, therefore, have not been widely incorporated on mountain bikes.

Mountain bike rear suspension designs, utilizing multiple linkage members, are currently used and are often effective at isolating pedal-induced and brake-induced forces from acting on the rear suspension. However, one problem associated with prior mountain bike rear suspension designs involves placement of the rear shock absorber. Due to the relatively complex nature of common mountain bike rear suspension assemblies, the rear shock absorber cannot always be placed in an optimal position.

SUMMARY OF THE INVENTION

There exists a continuing need to develop new configurations for the placement and mounting of rear suspensions on bicycle frames. Along with this need, there also exists a need to develop new designs for shock absorbers and shock absorber mounting equipment to facilitate the new configurations for the placement and mounting of rear suspensions on bicycle frames.

According to some embodiments, a bicycle assembly can comprise a main frame, a sub-frame configured to rotate with respect to the main frame, and a shock absorber. The main frame can include a seat tube, a head tube and an intermediate tube connecting the seat tube and the head tube. The shock absorber can have first and second opposing ends and first and second eyelets at each end. The first eyelet at the first end is preferably connected to the main frame. The bicycle assembly may further include an extension body comprising a first end connected to the shock absorber at the second eyelet and a second end comprising a pair of extension arms, each extension arm connected to the sub-frame, wherein a rear pivot of the shock absorber is defined by a connection point between each extension arm and the sub-frame, and the rear pivot configured to be at the sides of a rear wheel.

The first end of the extension body in some embodiments can receive the second eyelet within the extension body and the axis of the center of the second eyelet is at least about 15 degrees offset from the axis of the center of the first eyelet, such that the extension body forms a rigid, non-rotating connection with the second eyelet.

The bicycle assembly according to some embodiments can further include a fastener securing the extension body and the second eyelet of the shock absorber. A spacer can also be provided to be within the second eyelet, the spacer having a hole to receive the fastener. In some embodiments, the hole in the spacer is off-center such that the position of spacer within the eyelet allows for the adjustment of the length of combined shock absorber and extension body.

According to some embodiments the bicycle assembly can further comprise a fork, a saddle, the rear wheel and/or a front wheel and the sub-frame can comprise a pair of seat stays and a pair of chain stays. Further in some embodiments, the axis of the center of the second eyelet is at least about 45, 60, or 80 degrees offset from the axis of the center of the first eyelet.

A bicycle assembly can include a bicycle frame and the bicycle frame can include various components. Some of these components can include a main frame, a sub-frame configured to rotate with respect to the main frame, a shock absorber configured to regulate the relationship between the main frame and the sub-frame, and an extension body. Certain main frames have a seat tube, a head tube and a top tube connecting the seat tube and the head tube. The shock absorber can include a first eyelet to connect to the main frame and a second eyelet. The extension body can have various configurations. For example, a first portion can be configured to connect to the second eyelet of the shock absorber and form a rigid non-rotating connection, and a second portion can comprise a pair of extension arms. Further in some embodiments, the extension arms can be configured to straddle a rear wheel such that a rear pivot of the shock absorber is at the sides of the rear wheel, the front pivot being at the first eyelet of the shock absorber.

In some embodiments, the second eyelet of the shock absorber is perpendicular to the axis of rotation of both the front and rear pivots. The second eyelet can be offset 90 degrees from the first eyelet.

According to some embodiments, the bicycle assembly can further comprise a fastener to secure the extension body and the second eyelet of the shock absorber. Further a spacer can be used within the second eyelet. The spacer can have a hole to receive the fastener. The hole in the spacer can in centered or off-center. Where hole in the spacer is off-center, the position of spacer within the eyelet can allow for the adjustment of the length of combined shock absorber and extension body. Further, the extension body can also be configured to be adjustable. For example, the extension body can include two or more extension body holes for receiving the fastener and allowing for further adjustment of the length of combined shock absorber and extension body by selection of the extension body hole.

Some embodiments of a bicycle assembly can comprise a main frame having a seat tube, a head tube and a top tube connecting the seat tube and the head tube. The bicycle assembly may further include a sub-frame configured to rotate with respect to the main frame, the frame being configured to regulate the relationship between the main frame and the sub-frame with a shock absorber having a first eyelet for connecting to the main frame and a second eyelet. In some embodiments, the bicycle assembly can also include an extension body, a fastener and a spacer. The extension body can have a first portion configured to connect to the second eyelet of the shock absorber and a second portion. The fastener can be used to secure the extension body and the second eyelet of the shock absorber. The spacer can be configured to reside within the second eyelet. The spacer can have an off-center hole to receive the fastener, such that the position of spacer within the eyelet allows for a user to adjust a length of the shock absorber and extension body.

In some embodiments, the second portion of the extension body can comprise a pair of extension arms configured to straddle a rear wheel such that a rear pivot of the shock absorber is at the sides of the rear wheel, the front pivot being at the first eyelet of the shock absorber.

BRIEF DESCRIPTION OF THE DRAWINGS

These and other features, aspects and advantages are described below with reference to drawings of preferred embodiments, which are intended to illustrate but not to limit the present invention.

DETAILED DESCRIPTION OF THE PREFERRED EMBODIMENT

Figure 1:
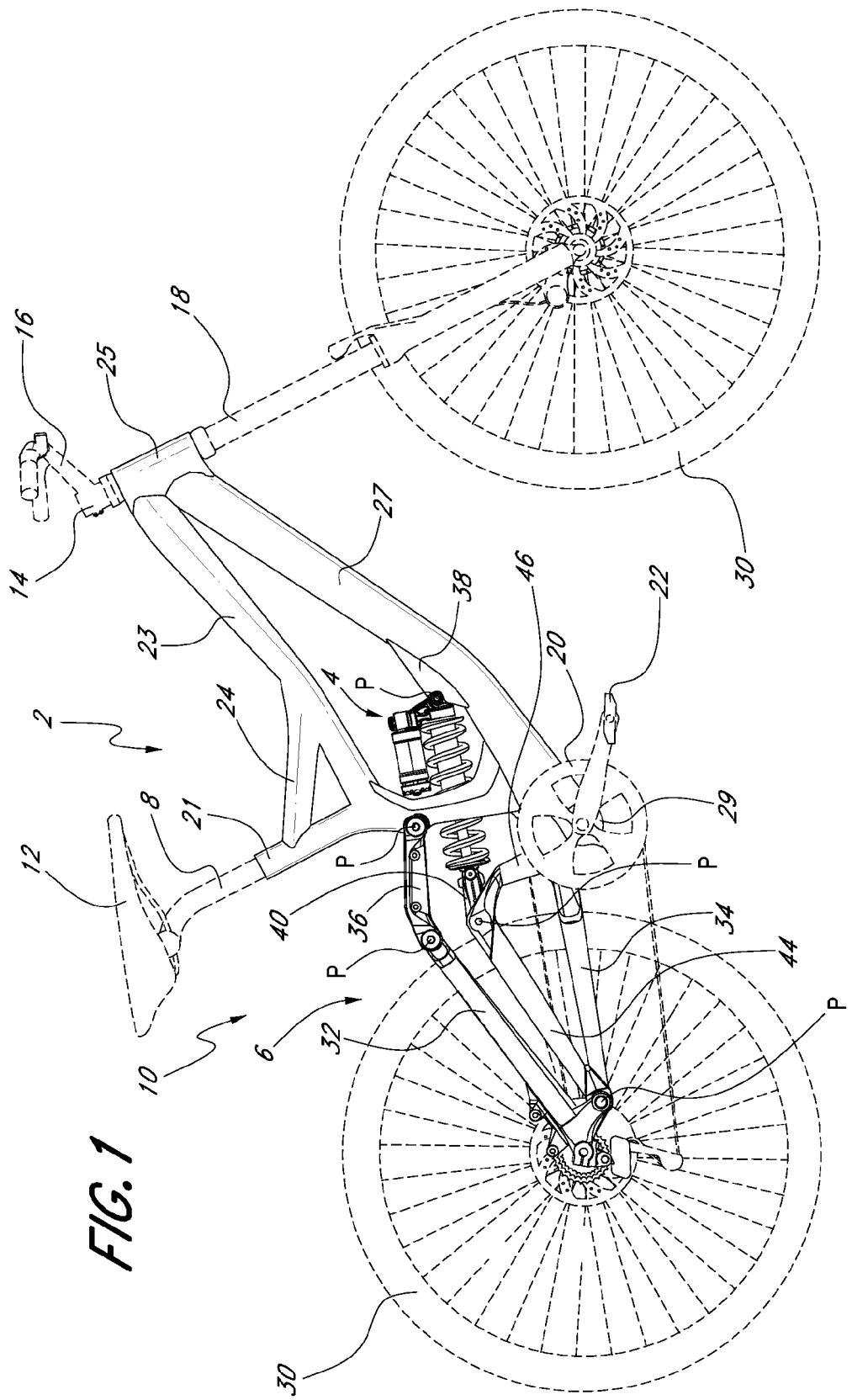
FIG. 1 is a side view of an embodiment of a bicycle frame.

A bicycle, as shown in FIG. 1, has a bicycle frame 10 with a rear suspension system. The bicycle frame 10 is made-up of a main frame 2, a shock absorber 4 and a sub-frame 6. A main frame 2, according to some embodiments, has a seat tube 21, a top tube 23 and a head tube 25. The top tube 23 can connect the seat tube 21 and the head tube 25. A seat post 8 with an attached saddle 12 can be installed in the seat tube 21. A steering post or column 14 which connects the handle bars 16 and the fork 18 can be installed in the head tube 25. The fork can support the front wheel 30. Some embodiments may further include a down tube 27 and a bottom bracket 29. The down tube 27 can connect the bottom bracket 29 and the head tube 25. A crank 20 can be installed into the bottom bracket 29 to which pedals 22 can be attached.

According to some embodiments, the main frame 2 can further include one or more gussets or cross tubes 24. The cross tubes can connect various parts of the main frame 2. For example, in FIGS. 1-2, the cross tube 24 connects the seat tube 21 and the top tube 23. Cross tubes 24 can increase the frame's stability and allow for additional design features, such as a downward sloping top tube 23.

Figure 2:
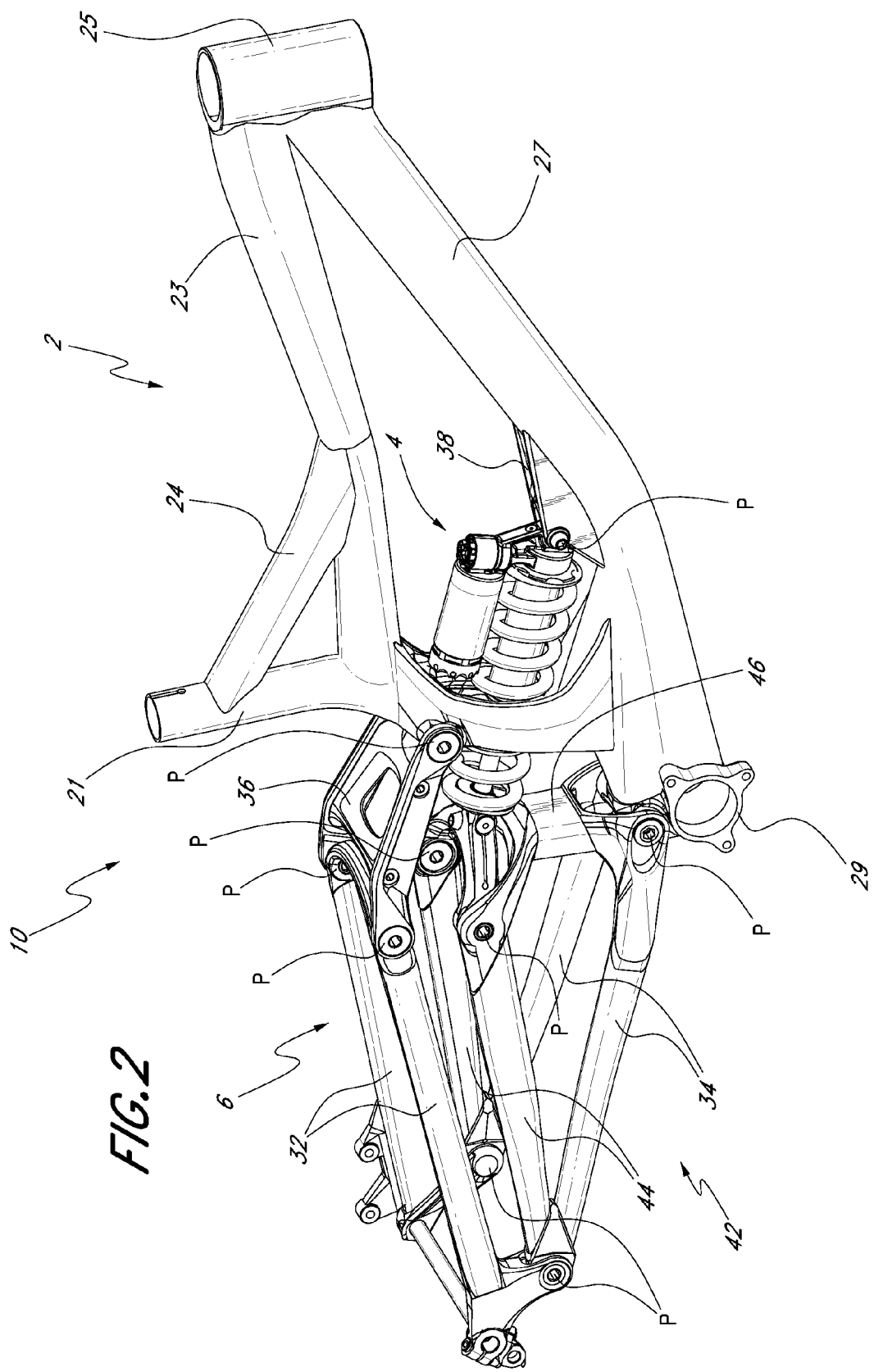
FIG. 2 illustrates a perspective view of the bicycle frame of FIG. 1.

As mentioned, the bicycle frame 10 can also include a sub-frame 6 and a shock absorber 4. The sub-frame 6 is movable relative to the main frame 2. The shock absorber 4 regulates movement between the sub-frame 6 and the main frame 2. A pivot axis P is shown in FIGS. 1-2 to illustrate the various points of rotation on the bicycle frame 10.

The sub-frame 6 can include a pair of seat stays 32 and a pair of chain stays 34. Each seat stay 32 can connect with a corresponding chain stay 34 and can support a rear wheel 30. This connection can be fixed or pinned to allow for rotation. In some embodiments, the chain stays 34 are hingedly connected to the main frame at or near the bottom bracket 29.

A link 36 can also be used to connect the main frame 2 and sub-frame 6. In some embodiments, the link 36 is pivotally connected to the main frame 2 and sub-frame 6. In some embodiments, the link 36 can be attached to the shock absorber 4, instead of, or in addition to, either the main frame 2 or the sub-frame 6.

A forward end of the shock absorber 4 is shown rotatably coupled to the main frame 2 for a rotation about a pivot axis P. This pivot axis P can be defined by a shock mount 38. A rearward end of the shock absorber 4 is coupled to an extension body 40 which is rotatably coupled to the sub-frame 6 and, more specifically, to a shock mount assembly 42 for a rotation about a pivot axis P. The shock mount assembly 42 can include a first arm 44 and a second arm 46 that, along with the chain stays 34, define an essentially triangular shape in plan view. The shock absorber 4 can be used to control the amount of movement between the main frame 2 and the sub-frame 6 and the rate of change in their relationships.

Further relating to the movement of the different parts of a bicycle frame, pivot axis P is used in some of the figures, such as FIG. 2, to show the various pivot points where some of the different components of the bicycle frame 10 are connected. The pivot axis P can define connection points which in some embodiments and in some locations can include bushings, or bearings, though this is not required. For example, in some embodiments there are cartridge ball bearings at the pivot axis P, where the extension body 40 connects to the sub-frame 6.

Though one configuration of a bicycle frame 10 is shown, those skilled in the art understand that various configurations are possible and may also be desirable.

Figure 3:
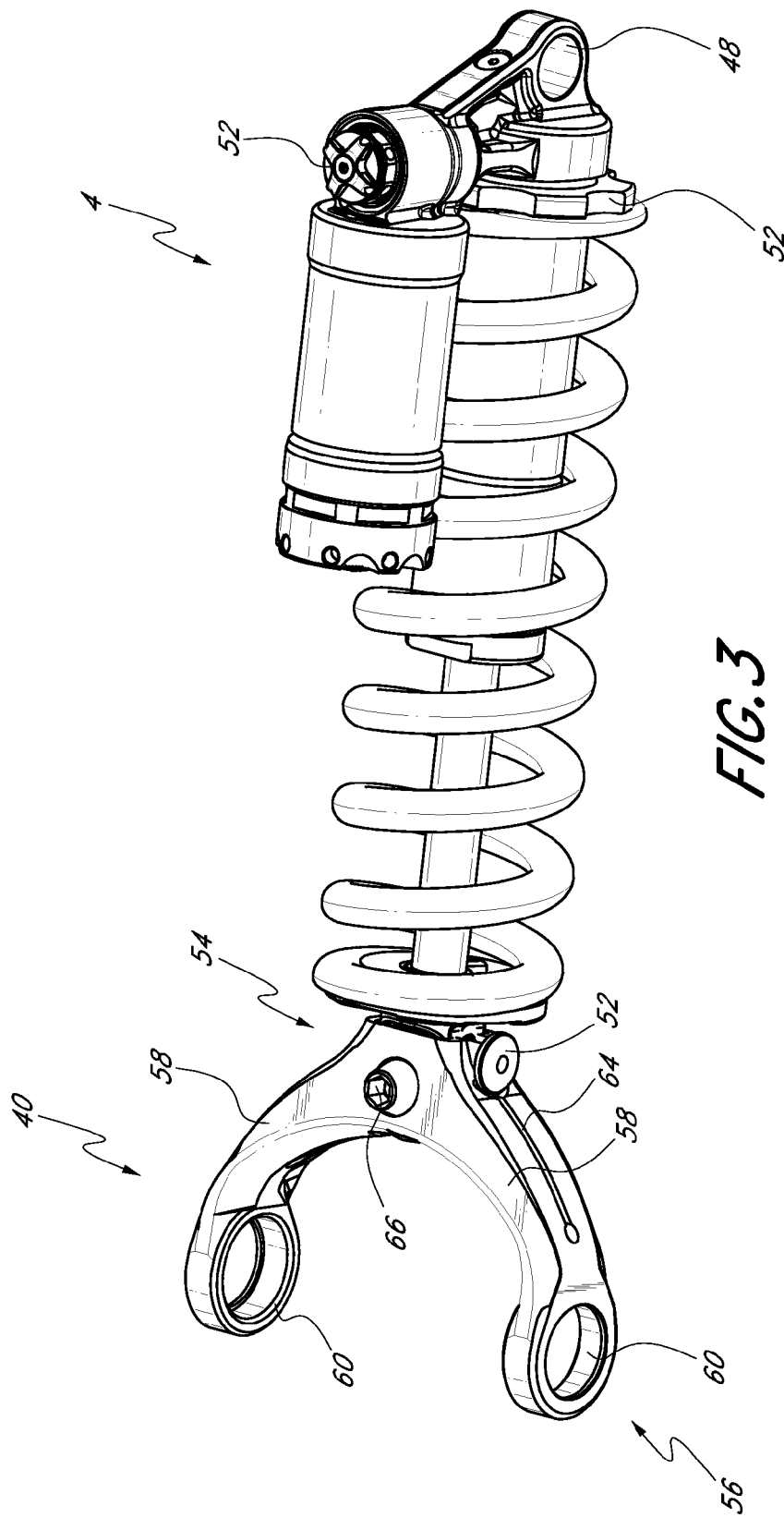
FIG. 3 is a perspective view of an embodiment of a shock absorber and an extension body.
Figure 4:
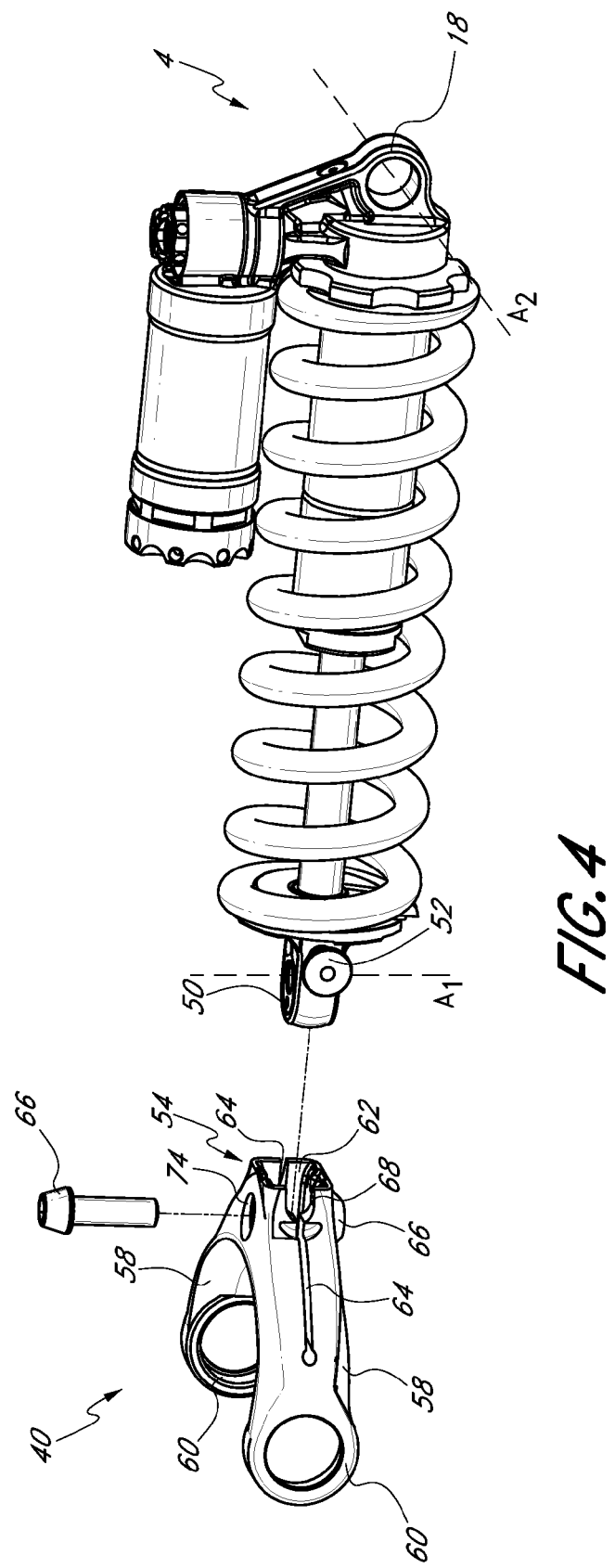
FIG. 4 shows an exploded partial view of the shock absorber and extension body of FIG. 3.

Turning now to FIGS. 3-4, a shock absorber 4 and extension body 40 are shown. The shock absorber 4, according to some embodiments, can be a commonly available fluid and/or coil spring shock absorber. In some embodiments, the fluid can be oil and/or air.

The shock absorber 4 shown has an eyelet 48, 50 at either end to attach the shock absorber 4 to a bicycle frame as part of a rear suspension. Though the shock absorber can be a commonly available shock, the shock absorber 4 used here has been adjusted or modified, such that the rear eyelet 50 is perpendicular to the typical axis of rotation and, in fact, the rear eyelet 50 is not used for rotation. Thus, as can best be seen in FIG. 4, the center axis $A_1$ of the opening of the rear eyelet 50 is offset 90 degrees from the center axis $A_2$ of the opening of the front eyelet 48. This can generally be done by simply rotating the eyelet 50 and shaft of the shock absorber by hand in relation to the other eyelet 48 to reach the desired position and orientation.

The shock absorber 4 can also have adjustment controls 52. The adjustment controls 52 can include adjustments for dampening, rebound, pressure and other adjustments. The adjustment controls can include adjustment knobs, a Schrader or Presta valve, and/or a preloading ring as are known in the art.

The extension body 40 has a first end 54 and a second end 56. The first end 54 can be configured to receive an eyelet 48, 50 of a shock absorber 4 and the second end 56 can be configured to connect to a bicycle frame 10. In some embodiments, the second end of the extension body 40 and the bicycle frame 10 can be pivotally connected. The connection point may include bearings, bushings or other features to reduce friction and allow for smooth rotation and movement. The extension body 40 can be used to effectively increase the length of the shock absorber 4. This increased length of the shock 4 can change the pivot points at which the shock absorber 4 is attached to the bicycle frame 10 and can thereby change the relative motions that the shock absorber 4, main frame 2 and sub-frame 6 experience in relation to one another.

In some embodiments, the second end 56 of the extension body includes a pair of extension arms 58. Each extension arm 58 can have an eyelet 60. The extension arms 42 can allow the shock absorber 4 to span part, or all, of the rear wheel, the seat tube or other parts of the bicycle. In this way, extension arms 58 allow the extension body to, not only move the rear the pivot location of the shock absorber 4 to a more distant location, but also to locate the rear pivot to a spot not previously available or possible. For example, the extension arms can move the pivot location to the sides of the wheel, where previously, the rear pivot of the shock absorber could only be located in front of the rear wheel. The extension arms also provide additional benefits as detailed below.

Another feature of certain embodiments of extension bodies 40, is an inner surface 62 defining a cavity configured to receive an eyelet 48, 50 of the shock absorber 4. The inner surface 62 can be contoured or shaped to receive the eyelet. Preferably, the inner surface 62 can be shaped to receive the eyelet of any of the many commonly available or custom shock absorbers. In some embodiments, the inner surface can be contoured, such as to form a round cavity shaped to closely match the outside surface of the eyelet. In other embodiments, the extension body 40, and/or the first end 54 of the extension body can be hollow to allow for various different configurations of eyelets and shock absorber ends to fit within the extension body 40. In some embodiments, the inner surface can closely fit the eyelet so as to restrict rotation and/or other movement between the extension body and the shock absorber. In some embodiments, a looser fit can be provided. This can permit the selection of a wider variety of shape of mating eyelets and/or shock absorbers.

Figure 5:
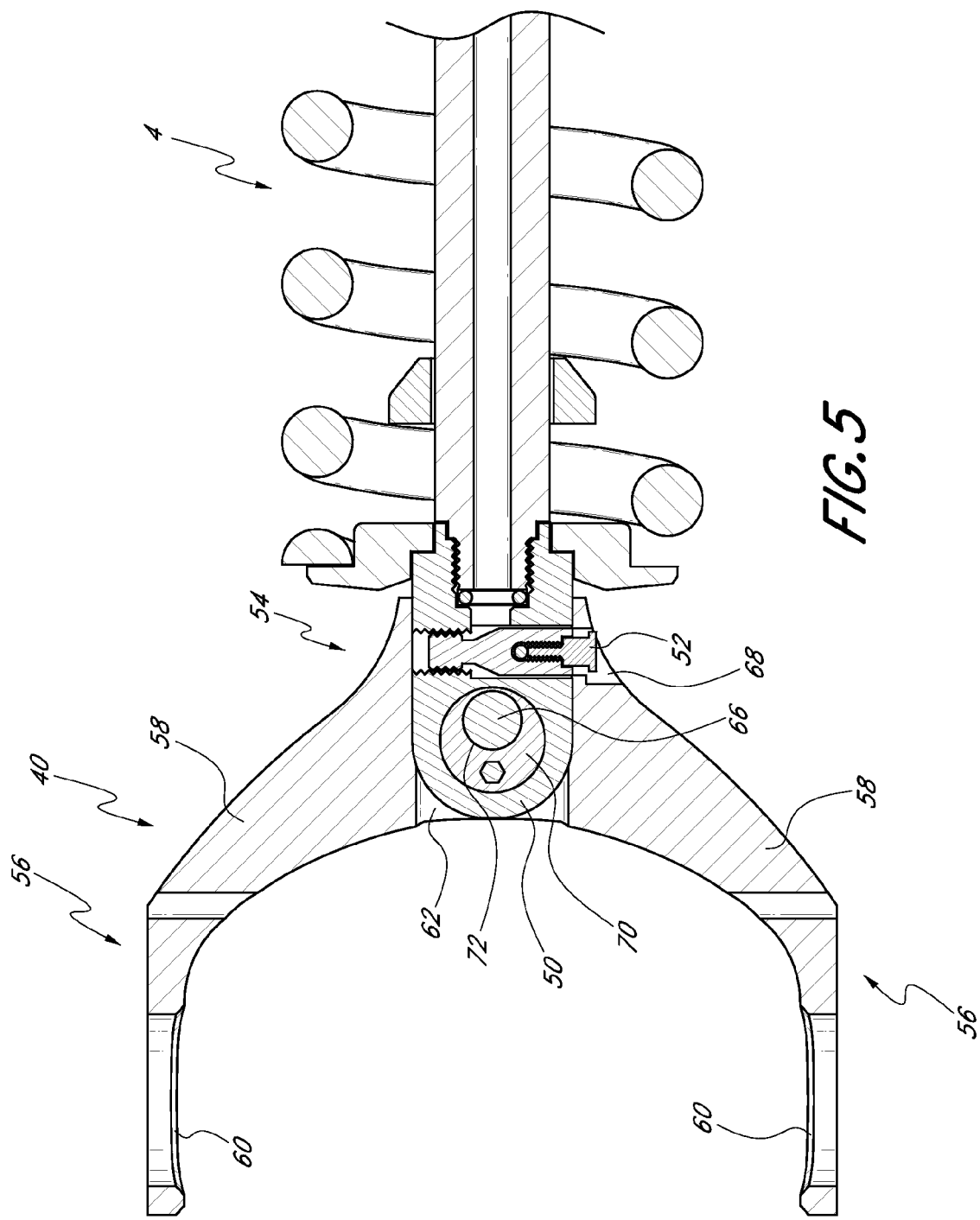
FIG. 5 is a cross-sectional view of the connected shock absorber and extension body of FIG. 3.

In some embodiments, the inner surface 62 can be configured to receive an eyelet 50 of a shock absorber 4 that has been rotated or modified to be offset 90 degrees from the typical orientation of the eyelet, such as 90 degrees from the orientation of the other eyelet 48. In some embodiments, the inner surface 62 is formed to create a cavity closed at all but one end. In some embodiments, the inner surface 62 forms a cavity that is open at the front and back of the cavity, where the cavity passes through the extension body 40 (FIG. 5).

As shown in FIGS. 3-4, the first end 54 of the extension body 40 can be hollow and can include an opening or slit 64. The slit 64 can extend from the first end 54 to the second end 56. In some embodiments, the slit, 64 extends into at least part of the extension arms 58. The slit 64 can allow the top and bottom of the first end 54 of the extension body 40 to be clamped down on the eyelet, and/or end of the shock absorber, to secure the same in place within the extension body 40. This can allow a rigid connection to be formed between the shock absorber 4 and the extension body 40. A fastener 66, such as a bolt and nut, can be used to secure the shock absorber 4 and extension body 40 together.

Features of the extension body and shock absorber can substantially prevent rotation between these two mating bodies. For example, the inner surface 62 and/or the fastener 66 can be used to substantially prevent rotation. Substantially prevent rotation can include rotating less than 25°, 20°, 15°, 10°, 5°, 3°, 2°, and 1°.

The extension body 40 can also include one or more slots or holes, to accommodate certain features on or near the eyelet and the end of the shock absorber 4. For example, a slot 68 can be located at the first end 54 to accommodate an adjustment control 52 such as a rebound knob, located near the eyelet. In some embodiments, a stock or custom shock absorber 4 is provided, wherein an adjustment control 52 near an eyelet or shock end is replaced with a modified adjustment control 52, designed for use with an extension body 40. For example, the new adjustment control 52 can be smaller, larger, longer, etc. or some other shape different from the original.

Some embodiments of shock absorber 4 can have an additional outside fluid reservoir (not shown). A hole or slot in the extension body 40, such as slot 68, can be configured to accommodate a hose for connecting the shock absorber 4 to the fluid reservoir.

The use of an extension body 40 that can receive a number of commonly available or custom shock absorbers provides great benefits to both the manufacturer and the end consumer. The extension body is interchangeable with different shocks and therefore can be used on different bicycles and those bicycles can be upgraded, modified or repaired to incorporate different or similar shocks depending on consumer preference or as required. This also reduces cost for the manufacturer because different extension bodies do not need to be manufactured for use with different shocks and/or bikes, and custom shocks do not have to be manufactured.

The use of an extension body 40 with extension arms 58 can also be beneficial. Extension arms can beneficially allow a bicycle manufacturer to create its own pivot point for the shock absorber, rather than being required to use the rear shock absorber eyelet. For example, the surface of the extension arms can be used to create a stronger, more durable, and smoother connection and pivot. Instead of using the DU bushings provided with the stock shock, cartridge ball bearings, which are smoother and more durable, can be used at the interface between the extension arm and the sub-frame. In addition and as mentioned previously, the extension arms also beneficially allow the rear shock absorber pivot to be placed in locations that were previously impossible, for example, at the sides of the tires. Also, the extension arms allow the shock pivot points to be placed in more optimal locations. The shock absorber 4 can be placed in a compact, lower profile orientation within the frame and still achieve a shock leverage motion which matches that of other bikes with a higher or not as compact orientation.

The extension body 40 can provide a robust shock absorber-extension body interface. With the extension body 40 as shown and discussed above, the connection between the extension body and the eyelet is strengthened by rotating the eyelet 90 degrees to its typical orientation. In some embodiments, the extension body can be configured to receive an eyelet rotated between 80-100°, 60-120°, 40-140°. This can include angle between the axis of at least 15°, 30°, 45°, 60°, 75°, 80°, 85°. This can reduce the interface strength requirements and prevent the tendency of the shock absorber-extension body interface to rotate or buckle. There is a reduced propensity to rotate about the typical eyelet axis (parallel to $A_2$) at the interface because the eyelet is perpendicular, or at least not parallel, to its typical orientation.

In addition, the extension arms further reduce the propensity of the interface to rotate about the axis $A_1$ of the new eyelet orientation. This is because of the wide bracing provided by the extension body which can form a wide v-shaped or y-shaped yoke. The wide bracing reduces the tendency of the interface to rotate about the new eyelet axis $A_1$.

Rotating or modifying the shock absorber 4, so that the eyelet 50 is rotated 90 degrees from its typical position, can also beneficially move certain of the adjustment controls 52 to the side. Having adjustment controls 52 on the side of the bicycle can have many benefits. For example, the user can visually and clearly see the adjustments being made. If the user is standing next to the bicycle making the adjustments, they are likely to be on the side of the bike and will be able to easily see the adjustments being made. They will have a clear unobstructed view of the adjustment control 52 plus any setting markings. If the user is on the bike, it is easy for them to reach down and make an adjustment with a normal rotational movement of their hand.

Referring now to FIG. 5, a system for securing the shock absorber 4 and the extension body 40 is shown. In some embodiments, a fastener 66, such as a bolt can be used to secure the eyelet 50 within the extension body 40. The fastener 66 can have an outside diameter that fills or is smaller than the eyelet 50. As shown, the fastener 66 is smaller than the eyelet 50 and a spacer 70 is used to create a tight fit between the fastener and the eyelet. It can be desirable to provide a rigid and secure connection between the shock absorber 4 and the extension body 40. The fastener, the fastener and spacer and/or other features can be used to create a rigid and secure connection.

The extension body 40 can include a hole 74 for the fastener to pass through (See FIG. 4). The hole 74 can pass through all or part of the extension body 40 and can pass through any of the top, bottom and/or sides of the extension body 40. As shown, the hole 74 passes from the top to the bottom. In other embodiments, the hole 74 can pass through the side or at an angle. In some embodiments, part or all of the hole 74 is threaded or unthreaded.

The spacer 70 can be placed within the eyelet 50 and the eyelet 50 can then be advanced into the cavity defined by the inner surface 62 in the extension body 40. The spacer 70 can also have a hole 72 for the fastener 66 to pass through. As already mentioned, the fastener 66 can secure the spacer 70, and thereby the eyelet 50, within the extension body 40.

The hole 72 in a spacer 70 can determine where the fastener 66 passes through the eyelet. Generally, the eyelets of a typical shock absorber are round. The spacer 70 can also be round or other shapes that can fit within the eyelet. The hole 72 in the spacer 70 can be centered with the spacer or off-center. Thus, with a fixed hole 74 in the extension body 40, the hole 72 in the spacer and within the eyelet can determine where the fastener passes through the eyelet and can thereby determine a spatial relationship between the shock absorber and the extension body.

A spacer 70 with an off-center hole 72 can also be used to adjust the relationship of the shock absorber 4 and the extension body 40. The spacer in some embodiments can be placed within the eyelet so as to line up with the hole 74 in one of two positions. The two positions of the spacer can be about 180° apart. In one position, the hole 72 can be positioned to be closer to the first end 54 and in another position, the hole 72 can be positioned to be closer to the second end 56. In this way, the position of the hole 72 within the eyelet 50 can be used to lengthen or shorten the total length of the shock/extension body combination. In some embodiments, the spacer 70 can include more than one hole 72. The different holes can be different distances away from the center or sides of the spacer. Selection of which hole 72 in the spacer 70 to use can then determine the total length of the shock/extension body combination.

In some embodiments, the extension body 40 can include two or more holes 74, so that the selection of the particular hole 74 can be used to adjust the relationship of the extension body 40 and shock absorber 4. In addition, a spacer 70 with an off-center hole 72 can be used to further increase the adjustability of the extension body and shock absorber positions within the particular selected hole 74.

By changing the length of the shock/extension body combination, the rear suspension linkage extends or compresses its neutral static state. The byproduct of this is the raising or lowering of the crank height, or steepening or slackening the steering geometry. These geometry adjustments are favorable to setting up the handling characteristics to individual rider preferences.

In these ways, a simple, light weight, and unobtrusive system can be provided to simply and cleanly adjust the frame geometry.

In some embodiments, the fastener 66 and hole 74 can be used to prevent rotation of the extension body and shock absorber, instead of or in addition to the inner surface 62. In some embodiments, the inner surface 62 can be used simply to maintain the eyelet within the cavity defined by the inner surface 62. As disclosed, both the fastener 66/hole 74 combination and the inner surface 62 are used to prevent rotation and distribute forces over a wider surface area.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A bicycle assembly comprising:
    a main frame comprising a seat tube, a head tube and an intermediate tube connecting the seat tube and the head tube;
    a sub-frame configured to rotate with respect to the main frame;
    a shock absorber having first and second opposing ends and first and second eyelets at each end, the first eyelet at the first end connected to the main frame; and
    an extension body comprising a first end connected to the shock absorber at the second eyelet and a second end comprising a pair of extension arms, each extension arm connected to the sub-frame, wherein a rear pivot of the shock absorber is defined by a connection point between each extension arm and the sub-frame, and the rear pivot configured to be at the sides of a rear wheel;
    wherein the first end of the extension body receives the second eyelet within the extension body and the axis of the center of the second eyelet is at least about 15 degrees offset from the axis of the center of the first eyelet, such that the extension body forms a rigid, non-rotating connection with the second eyelet.

2. The bicycle assembly of claim 1, further comprising a fastener securing the extension body and the second eyelet of the shock absorber.

3. The bicycle assembly of claim 2, further comprising a spacer within the second eyelet, the spacer having a hole to receive the fastener.

4. The bicycle assembly of claim 3, wherein the hole in the spacer is off-center such that the position of spacer within the eyelet allows for the adjustment of the length of combined shock absorber and extension body.

5. The bicycle assembly of claim 1, further comprising a fork, a saddle, the rear wheel and a front wheel.

6. The bicycle assembly of claim 1, wherein the sub-frame comprises a pair of seat stays and a pair of chain stays.

7. The bicycle assembly of claim 1, wherein the axis of the center of the second eyelet is at least about 45, 60, or 80 degrees offset from the axis of the center of the first eyelet.

8. A bicycle assembly comprising:
a bicycle frame comprising:
a main frame comprising a seat tube, a head tube and a top tube connecting the seat tube and the head tube;
a sub-frame configured to rotate with respect to the main frame;
a shock absorber configured to regulate the relationship between the main frame and the sub-frame, the shock absorber comprising a first eyelet to connect to the main frame and a second eyelet; and
an extension body having a first portion configured to connect to the second eyelet of the shock absorber and form a rigid non-rotating connection, and a second portion, the second portion comprising a pair of extension arms;
wherein the extension arms are configured to straddle a rear wheel such that a rear pivot of the shock absorber is at the sides of the rear wheel, the front pivot being at the first eyelet of the shock absorber.

9. The bicycle assembly of claim 8, wherein the second eyelet is perpendicular to the axis of rotation of both the front and rear pivots.

10. The bicycle assembly of claim 8, wherein the second eyelet is offset 90 degrees from the first eyelet.

11. The bicycle assembly of claim 8, further comprising a fastener to secure the extension body and the second eyelet of the shock absorber.

12. The bicycle assembly of claim 11, further comprising a spacer within the second eyelet, the spacer having a hole to receive the fastener.

13. The bicycle assembly of claim 12, wherein the hole in the spacer is off-center such that the position of spacer within the eyelet allows for the adjustment of the length of combined shock absorber and extension body.

14. The bicycle assembly of claim 13, wherein the extension body comprises two or more extension body holes for receiving the fastener and allowing for further adjustment of the length of combined shock absorber and extension body by selection of the extension body hole.

15. The bicycle assembly of claim 8, wherein the sub-frame comprises a pair of seat stays and a pair of chain stays.

16. The bicycle assembly of claim 8, further comprising a fork, a saddle, the rear wheel and a front wheel.

17. A bicycle assembly comprising:
a main frame comprising a seat tube, a head tube and a top tube connecting the seat tube and the head tube;
a sub-frame configured to rotate with respect to the main frame, the frame being configured to regulate the relationship between the main frame and the sub-frame with a shock absorber having a first eyelet for connecting to the main frame and a second eyelet;
an extension body having a first portion configured to connect to the second eyelet of the shock absorber and a second portion;
a fastener to secure the extension body and the second eyelet of the shock absorber; and
a spacer configured to reside within the second eyelet, the spacer having an off-center hole to receive the fastener, such that the position of spacer within the eyelet allows for a user to adjust a length of the shock absorber and extension body.

18. The bicycle assembly of claim 17, further comprising the shock absorber, wherein the second eyelet is perpendicular to an axis of rotation of the first eyelet.

19. The bicycle assembly of claim 17, further comprising the shock absorber, wherein the second eyelet is offset 90 degrees from the first eyelet.

20. The bicycle assembly of claim 17, wherein the extension body comprises two or more extension body holes for receiving the fastener and allowing for further adjustment of the length of combined shock absorber and extension body by selection of the extension body hole.

21. The bicycle assembly of claim 17, wherein the second portion of the extension body comprising a pair of extension arms configured to straddle a rear wheel such that a rear pivot of the shock absorber is at the sides of the rear wheel, the front pivot being at the first eyelet of the shock absorber.

22. The bicycle assembly of claim 17, further comprising a fork, a saddle and two wheels.

* * * * *